(12) United States Patent
Dharmapurikar et al.

(10) Patent No.: US 9,817,574 B2
(45) Date of Patent: Nov. 14, 2017

(54) METHOD AND APPARATUS FOR IMPLEMENTING A STATISTICS COUNTER

(71) Applicant: Cisco Technology, Inc., San Jose, CA (US)

(72) Inventors: Sarang Dharmapurikar, Cupertino, CA (US); Ganlin Wu, Palo Alto, CA (US); Alex Seibulescu, San Mateo, CA (US); Wanli Wu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 128 days.

(21) Appl. No.: 15/004,615

(22) Filed: Jan. 22, 2016

(65) Prior Publication Data
US 2017/0212684 A1    Jul. 27, 2017

(51) Int. Cl.
G06F 3/06    (2006.01)
G06F 12/02   (2006.01)
H04L 12/26   (2006.01)

(52) U.S. Cl.
CPC .......... G06F 3/0605 (2013.01); G06F 3/0608 (2013.01); G06F 3/0631 (2013.01); G06F 3/0673 (2013.01); G06F 12/023 (2013.01); H04L 43/08 (2013.01); *G06F 2212/1044* (2013.01); *G06F 2212/154* (2013.01)

(58) Field of Classification Search
CPC ..... H04L 43/08; G06F 3/0608; G06F 3/0631; G06F 3/0646; G06F 3/0647; G06F 3/0655; G06F 12/023; G06F 2212/1044
See application file for complete search history.

(56) References Cited

U.S. PATENT DOCUMENTS 7,401,169 B2 * 7/2008 Holbrook ................ H04L 49/90
  707/999.202
2001/0047360 A1 * 11/2001 Huras ............... G06F 17/30377

OTHER PUBLICATIONS

Hua et al., "BRICK: A Novel Exact Active Statistics Counter Architecture," IEEE/ACM Transactions on Networking, vol. 19, No. 3, Jun. 2011, p. 670-682.*

* cited by examiner

*Primary Examiner* — Hal Schnee
(74) *Attorney, Agent, or Firm* — P. Su

(57) ABSTRACT

According to one aspect, a method includes determining whether at least one memory storage unit in a first stage of a multi-stage array is available for use by a first counter associated with the first stage, and allocating the at least one memory storage unit for use by the first counter when the at least one memory storage unit is available. When the at least one memory storage unit is not available for use by the first counter, the method includes identifying a second counter stored in a first location in the first stage, the first location including a first memory storage unit and a second memory storage unit, and moving the second counter to a second stage of the multi-stage array, storing a pointer to the second stage in the first memory storage unit, and allocating the second memory storage unit to the first counter.

20 Claims, 8 Drawing Sheets

METHOD AND APPARATUS FOR IMPLEMENTING A STATISTICS COUNTER

TECHNICAL FIELD

The disclosure relates generally to communications networks. More particularly, the disclosure relates to efficiently and effectively managing counters in networking applications to prevent overflow.

BACKGROUND

Typically, when counters are implemented with respect to networking applications, a fixed amount of memory is allocated to each counter such that each counter has the same amount of memory with respect to a storage system. The allocation of a fixed amount of memory for each counter is generally an inefficient use of memory assets, as very few counters generally have large values and a majority of counters generally have small values. When counters are designed to accommodate a case in which some counters may be very large, a large percentage of memory bits in a storage system may be wasted, e.g., when the fixed amount of memory for each counter is allocated to support very large counters which do not occur very often.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
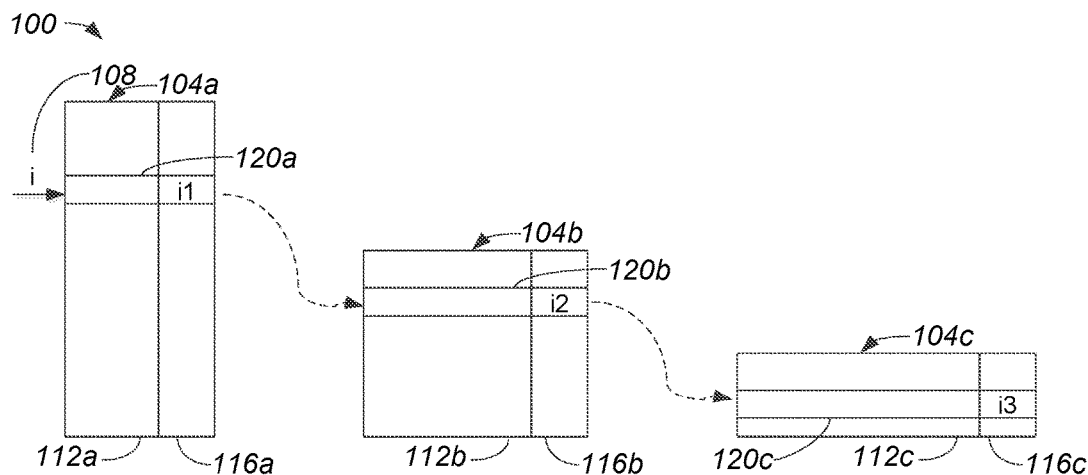
FIG. 1 is a diagrammatic representation of a first statistics counter architecture.

In one embodiment, a method includes determining whether at least one memory storage unit in a first stage of a multi-stage array is available for use by a first counter associated with the first stage and allocating the at least one memory storage unit for use by the first counter when it is determined that the at least one memory storage unit is available for use by the first counter. When it is determined that the at least one memory storage unit is not available for use by the first counter, the method includes identifying a second counter, the second counter being stored in a first location in the first stage, the first location including a first memory storage unit and a second memory storage unit, as well as moving the second counter to a second stage of the multi-stage array, storing a pointer to the second stage, the pointer being stored in the first memory storage unit and arranged to identify the second counter in the second stage, and allocating the second memory storage unit to the first counter.

Description

Packet counters are often used on static random access memories (SRAMs), e.g., on-chip SRAMs. At the end of a time period T, when counters are read, the distribution of counter values is typically skewed. Often, very few counters have relatively high values while a majority of counters have relatively small values. Many memory bits may be wasted if counters are designed such that all counters are equally wide, and are wide enough to count all packets within a time period T.

If the distribution of counters is known or may be relatively accurately predicted, it may be possible to provision memory such that a majority of counters are implemented with smaller numbers of bits, with a minority of counters, e.g., the counters which may overflow the smaller number of bits, are allocated extra, or overflow, bits. Multi-stage counters may be implemented to allow for the majority of counters to be implemented a smaller numbers of bits, and the minority of counters to be allocated extra bits.

With multi-stage counters, substantially all counters are allocated bits in a first stage. When the bits allocated to a counter in a first stage are overflowed or exceeded, bits are allocated to the counter in a second stage. The bits allocated to a counter in a first stage are associated with the bits allocated to the counter in a second stage when the counter overflows the first stage. If a counter overflows the bits allocated in both a first stage and a second stage, bits are allocated to the counter in a third stage. The number of stages associated with a multi-stage counter may vary widely. That is, any number of stages may be associated with a multi-stage counter. Pointers are generally used to associate the different stages of a counter.

In one embodiment, with respect to a given counter, a pointer may be used to associate counter bits of a first stage with counter bits of a second stage, with the counter bits of the first stage effectively being turned into a pointer when the counter bits of the first stage overflow. For the counter, a bit associated with the counter bits of the first stage may indicate whether the counter bits of the first stage are effectively a "normal" counter or are a pointer to the second stage. By substantially eliminating the use of dedicated memory for pointers, memory may be allocated more efficiently for use with counters.

Generally, a periodic software process may read counters every "T" clock cycles. To effectively ensure that counters do not overflow between two read cycles, e.g., between consecutive read cycles, a counter array arrangement which utilizes a relatively small amount of memory and supports relatively high speed memory updates may be implemented.

To reduce the number of bits allocated to counters, a first stage may be allocated with relatively few bits to accommodate most counters, and subsequent stages may be allocated with larger numbers of bits to accommodate relatively large counters. By reducing the number of bits allocated to most counters, memory may be allocated more efficiently.

Referring initially to FIG. 1, a first statistics counter architecture which allocates different number of bits depending upon the stage of a counter will be described. A multi-stage counter architecture 100 includes an array of first stage counters 104a, an array of second stage counters 104b, and an array of third stage counters 104c. Although architecture 100 is shown as including three stages, it should be appreciated that architecture 100 may general include fewer than or more than three stages. First stage counters are allocated in array 104a, second stage counters are allocated in array 104b, and third stage counters are allocated in array 104c.

Array 104a includes an area or sub-array 112a which stores first stage counters, and an area or sub-array 116a which stores pointers from array 104a to array 104b. Array 104b includes an area or sub-array 112b which stores second stage counters, and an area or sub-array 116b which stores pointers from array 104b to array 104c. Array 104c includes an area or sub-array 112c which stores third stage counters, and an area or sub-array 116c which stores pointers from array 104c to another array (not shown), e.g., an array that stores fourth stage counters.

In general, array 104a is the deepest but narrowest array, array 104b is shallower and wider than array 104a, and array 104c is shallower and wider than array 104b. As shown, array 104a has a depth of "N1" rows and sub-array 112a has a width of "w1" bits, array 104b has a depth of "N2" rows and sub-array 112b has a width of "w2" bits, and array 104c has a depth of "N3" rows and sub-array 112c has a width of "w3" bits. As shown, "N1" is larger than "N2," which is larger than "N3." "w1" is smaller than "w2," which is smaller than "w3." It should be understood that the values of "N1," "N2", "N3", "w1," "w2," and "w3" may vary widely. In one embodiment, "N1" may have a value of approximately 64K, "N2" may have a value of approximately 4K, "N3" may have a value of approximately "1K, "w1" may have a value of approximately eight, "w2" may have a value of approximately sixteen, and "w3" may have a value of approximately thirty two.

While the width of sub-arrays 116a-c may vary, in one embodiment, the number of bits allocated to sub-array 116a is expressed as the logarithm of "N2" (log(N2)), and the number of bits allocated to sub-array 116b is expressed as log(N3). Thus, the overall width of array 104a may be expressed as the sum of "w1" and log(N2), while the overall width of array 104b may be expressed as the sum of "w2" and log(N3). It should be appreciated that the number of bits allocated to sub-array 116c may be expressed as the logarithm of a depth of an array that stores fourth stage counters (not shown). Thus, the overall width of array 104c may be expressed as the sum of "w3" and the logarithm of a depth of an array that stores fourth stage counters (not shown).

When a packet 108 arrives for an index "i," a first stage counter is incremented at "i." If the first stage overflows, a second stage counter is allocated and the first stage counter is associated with the allocated second stage counter. If the second stage counter overflows, then a third stage counter is allocated.

For packet 108 for index "i," a second stage counter is associated to the first stage counter by a first pointer, and a third stage counter is associated to the second counter by a second pointer. A first entry 120a in array 104a includes a first stage counter and a pointer to a second entry 120b in array 104b. Second entry 120b includes a second stage counter and a pointer to a third entry 120c in array 104c. Third entry 120c includes a third stage counter and a pointer to an entry in another array (not shown).

While maintaining a pointer in each entry 120a, 120b, 120c is effective to associate different stage counters, a significant amount of memory is typically allocated to allow for the storage of pointers. Reducing the amount of memory allocated for the storage of pointers would allow for more memory to be available for storing counters. For example, reducing the amount of memory allocated for the storage of pointers would allow for the implementation of wider counters, or counters having more bits.

Figure 2:
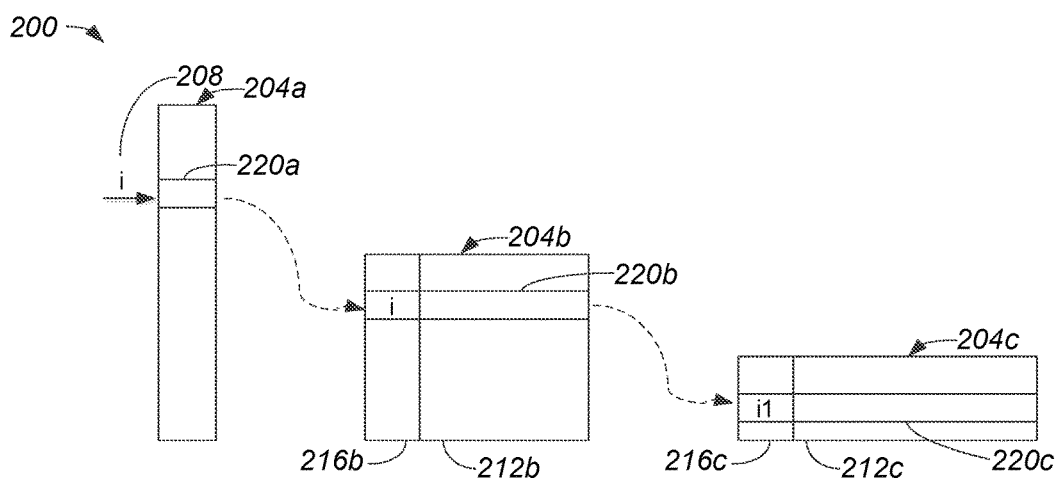
FIG. 2 is a diagrammatic representation of a second statistics counter architecture.

In one embodiment, content addressable memory (CAM) may be used to facilitate the storage of an index for an overflowing counter in stage "N" in CAM associated with stage "N+1." As will be appreciated by those skilled in the art, CAM may be searchable. FIG. 2 is a diagrammatic representation of a second statistics counter architecture which allocates less memory for the storage of pointers by utilizing CAM. A multi-stage counter architecture 200 includes an array of first stage counters 204a, an array of second stage counters 204b, and an array of third stage counters 204c. Although architecture 200 is shown as including three stages, it should be appreciated that architecture 200 may general include fewer than or more than three stages. First stage counters are allocated in array 204a, second stage counters are allocated in array 204b, and third stage counters are allocated in array 204c.

Array 204a stores first stage counters. Array 204b includes an area or sub-array 212b which stores second stage counters, and an area or sub-array 216b which stores pointers from array 204a to array 204b. Sub-array 216b typically includes CAM, while sub-array 216a typically includes static random access memory (SRAM). Array 204c includes an area or sub-array 212c which stores third stage counters, and an area or sub-array 216c which stores pointers from array 204b to array 204c. Sub-array 216c typically includes CAM, while sub-array 216c typically includes SRAM.

Generally, array 204a is the deepest but narrowest array, array 204b is shallower and wider than array 204a, and array 204c is shallower and wider than array 204b. As shown, array 204a has a depth of "N1" rows and a width of "w1" bits, array 204b has a depth of "N2" rows and sub-array 212b has a width of "w2" bits, and array 204c has a depth of "N3" rows and sub-array 212c has a width of "w3" bits. As shown, "N1" is larger than "N2," which is larger than "N3." "w1" is smaller than "w2," which is smaller than "w3." It should be understood that the values of "N1," "N2", "N3",fs "w1," "w2," and "w3" may vary widely. In one embodiment, "N1" may have a value of approximately 64K, "N2" may have a value of approximately 4K, "N3" may have a value of approximately "1K, "w1" may have a value of approximately eight, "w2" may have a value of approximately sixteen, and "w3" may have a value of approximately thirty two.

While the width of sub-arrays 216b, 216c may vary, the number of bits allocated to sub-array 216b may be expressed as the log(N1), and the number of bits allocated to sub-array 216c may be expressed as log(N2). Thus, the overall width of array 204b may be expressed as the sum of "w2" and log(N1), while the overall width of array 204c may be expressed as the sum of "w3" and log(N2).

When a packet 208 arrives for an index "i," an overflowing index "i" is stored in sub-array or CAM 216b. For packet 208 for index "i," a second stage counter is associated to a first stage a first pointer, and a third stage counter is associated to the second stage by a second pointer. A first entry 220a in array 204a includes a first stage counter, which is associated with a second entry 220b in array 204b through a first pointer. Second entry 220b includes a second stage counter and a pointer or index which associates second entry 220*b* with first entry 220*a*. A third entry 220*c* includes a third stage counter and a pointer or index 216*c* which associates third entry 220*b* with second entry 220*b*. Sub-array or CAM 216*b* stores a first stage overflowing counter, and sub-array or CAM 216*c* stores a second stage overflowing counter.

While the use of CAM is generally effective for storing pointers, it should be appreciated that CAM is relatively expensive, and typically has significant power requirements. In another embodiment, rather than utilizing CAM to store pointers, a first stage counter may effectively be turned into a pointer when the first stage counter overflows. As such, the amount of resources allocated to pointers may be significantly reduced.

Figure 3:
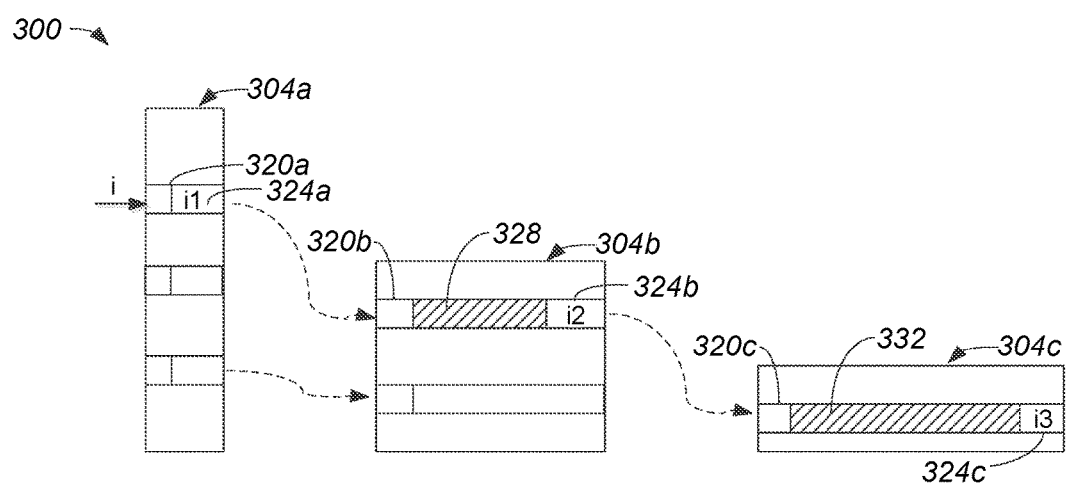
FIG. 3 is a diagrammatic representation of a third statistics counter architecture in accordance with an embodiment.

With reference to FIG. 3, a third statistics counter architecture that does not allocate a separate, dedicated memory for pointers will be described in accordance with an embodiment. A statistics counter architecture 300 includes a first stage array 304*a*, a second stage array 304*b*, and a third stage array 304*c*. In general, array 304*a* is the deepest but narrowest array, array 304*b* is shallower and wider than array 304*a*, and array 304*c* is shallower and wider than array 304*b*. As shown, array 304*a* has a depth of "N1" rows, array 304*b* has a depth of "N2" rows, and array 304*c* has a depth of "N3". Typically, "N1" is larger than "N2," which is larger than "N3." "w1" is smaller than "w2," which is smaller than "w3." It should be understood that the values of "N1," "N2", "N3", "w1," "w2," and "w3" may vary widely. In one embodiment, "N1" may have a value of approximately 64K, "N2" may have a value of approximately 4K, and "N3" may have a value of approximately 1K.

Entries in arrays 304*a-c* may be chained together using pointers. A first stage counter, which is an entry 320*a* in array 304*a* that corresponds to an index "i," effectively becomes a pointer when first stage counter 320*a* overflows. A bit in entry 320*a* may be used to indicate whether entry 320*a* contains a "normal" counter or whether entry 320*a* is a pointer to a second stage, e.g., array 304*b*.

The amount of memory allocated in array 304*a* for a first stage counter is such that the width of the first stage counter and, hence, array 304*a* is wide enough to contain a first stage counter plus at least one bit that is effectively a pointer flag, or a flag which indicates whether the contents of entry 320*a* contain a pointer or a first stage counter. By way of example, if array 304*b* contains approximately four thousand second stage counters, a first stage counter would typically have a width that is approximately thirteen bits, where twelve bits are associated with the first stage counter and one bit is allocated for a flag which indicates whether entry 320*a* is effectively a pointer. As such, a first stage counter typically has a width which may be expressed as the maximum of a width "w1" and log(N2) plus one, or max $\{w1, \log(N2)+1\}$. In other words, a first stage counter may have a width that may be log(N2) or greater. In one embodiment, because the width of counters in subsequent stages effectively dominates pointer width, counters stored in array 304*b* may have a width of "w2" plus one and counters stored in array 304*c* may have a width of "w3" plus one. It should be appreciated, however, that counters stored in array 304*b* may have a width which may be expressed as max $\{w2, \log(N3)\}+1$ and counters stored in array 304*c* may have a width which may be expressed as max $\{w3, \log(N4)\}+1$ where "N4" is a depth associated with a fourth stage array (not shown).

Entry 320*a*, as shown, includes a pointer 324*a* to array 304*b*. An entry 320*b* in array 304*b* includes a pointer 324*b* to array 304*b*, as well as unused space 328. It should be understood that unused space 328 is typically a result of pointers generally utilizing fewer bits than counters. An entry 320*c* in array 304*c* includes a pointer 324*c* to an array (not shown), e.g., an array which contains fourth stage counters, and unused space 332.

In general, free locations are allocated in a next stage relative to an overflowing counter in a previous stage. The allocation of free locations may be facilitated using a bit-map maintained in flip-flops of allocated locations per stage. By way of example, a 4K bit-map may be provided with respect to array 304*b*, and if a particular bit is set, a corresponding location within array 304*b* may be allocated, otherwise the corresponding location may be free or otherwise available. In one embodiment, an entry in second array 304*b* may effectively be grabbed, or otherwise reserved, by a first stage counter when the first stage counter overflows. When the first stage counter, e.g., the first stage counter corresponding to entry 320*a*, in array 304*a* grabs or otherwise obtains an entry in array 304*b*, e.g., entry 320*b*, the first stage counter effectively transfers its counter into the entry in array 304*b*, replaces the contents of the entry in array 304*a* with an allocated location pointer, e.g., pointer 342*a*, and sets a bit to indicate that the contents or value in entry 320*a* represent a pointer.

Figure 4:
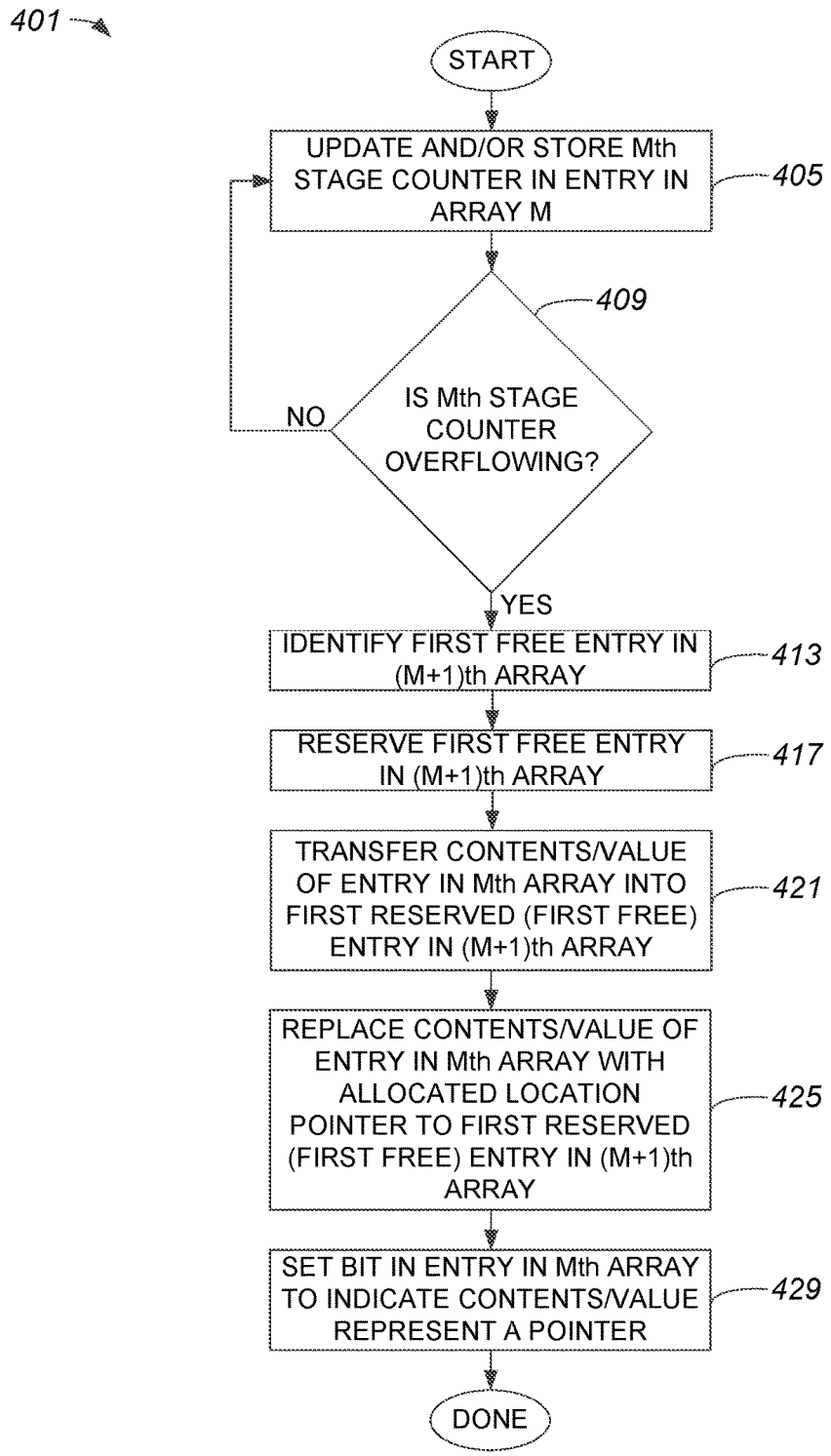
FIG. 4 is a process flow diagram which illustrates a method of creating a multi-stage pointer in accordance with an embodiment.

FIG. 4 is a process flow diagram which illustrates a method of creating a multi-stage pointer in accordance with an embodiment. A method 401 of creating a multi-stage pointer begins at step 405 in which an Mth stage counter is updated and/or stored in an entry in an array "M." The counter may be a first stage counter stored in a first array, or a subsequent stage counter stored in a subsequent array.

A determination is made in step 409 as to whether the Mth stage counter, which is stored in an entry in array "M," is overflowing. If the determination is that the Mth stage counter is not overflowing, process flow returns to step 405 in which the Mth stage counter is updated.

Alternatively, if the determination in step 409 is that the Mth stage counter is overflowing, then a first free entry is identified in a subsequent array, e.g., an (M+1)th array. The first free entry may be identified or allocated by scanning a flip-flop bitmap for an (M+1)th stage and determining a first index which does not have a bit set. Such an operation may be performed in hardware, and may be called "priority encoding." Priority encoding encodes or otherwise outputs an index of a first empty bit in a bitmap. Once the first free entry in the (M+1)th array is identified, the first free entry in the (M+1)th array is reserved in step 417 for use with respect to creating a multi-stage counter associated with the Mth stage counter.

After the first free entry in the (M+1)th array is reserved, the contents or the value of the entry in Mth array are transferred in step 421 into the first free entry in the (M+1)th array that was previously reserved. Transferring the contents from the entry in the Mth array to the entry in the (M+1)th array generally includes copying the contents from the entry in the Mth array into the entry in the (M+1)th array.

In step 425, the contents or value which were stored in the entry in the Mth array are replaced with an allocated location pointer which points to the first free entry that was previously reserved in the (M+1)th array. A bit is set in a first entry in the Mth to indicate whether the contents or value stored in the Mth array are set to represent a pointer in step 429. Upon the bit being set in step 429, the method of creating a multi-stage counter is completed.

Figure 5:
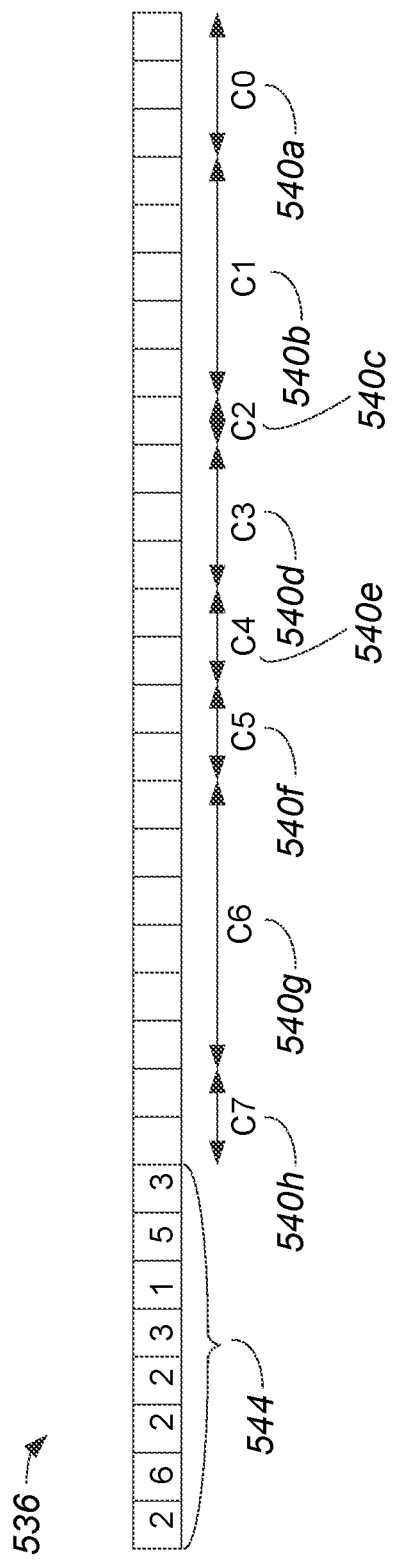
FIG. 5 is a diagrammatic representation of a row of first stage counters in accordance with an embodiment.

A multi-stage counter architecture may be configured to maintain multiple counters, as for example multiple first stage counters, in a shared row of an SRAM associated with the first stage counters. With reference to FIG. 5, a row of first stage counters will be described in accordance with an embodiment. A row of an SRAM 536 includes approximately eight counters 540*a-h*, and includes approximately ninety six bits. It should be appreciated that approximately ninety six bits may be considered to be approximately twenty four nibbles. The number of bits and counters included in row 536 may vary widely.

The number of nibbles associated with each counter 540*a-h* may vary. For example, a counter "C0" 540*a* may include approximately three nibbles, a counter "C1" 540*b* may include approximately five nibbles, and a counter "C1" 540*c* may include approximately one nibble. In general, the location of relatively small counters, e.g., counter "C2" 540*c*, and relatively large counters, e.g., counter "C8" 540*g*, may be substantially randomized.

It should be appreciated that substantially any counter may obtain any number of packets, resulting in relatively arbitrary counter widths. Typically, very few counters will be associated with a large number of packets, while a majority of counters will be associated with a low number of packets. The location of a counter associated with a relatively large number of packets may be arbitrary. To increase the likelihood that not all counters in a row are relatively large or wide, the placement of counters is substantially randomized. The randomization of the location of counter is effectively stateless, and generally does not consume extra memory.

The first approximately eight nibbles or thirty two bits of row 536 contain metadata 544. Metadata 544 is arranged to indicate how many nibbles are used by each counter 540*a-h*. That is, metadata 544 includes information which is arranged to allow counters 540*a-h* to be demarcated. For example, a value of "2" in the first nibble of metadata 544 indicates that counter 540*h* includes two nibbles and a value of "3" in the last nibble of metadata 544 indicates that counter 540*a* utilizes three nibbles.

It should be appreciated that a counter 540*a-h* may utilize zero nibbles or bits if there is effectively no count or value for that counter 540*a-h*. In other words, if a counter has no value, then the counter may effectively use no bits, and metadata 544 would indicate that the counter uses no nibbles.

The substantially maximum number of nibbles allocated to a counter may effectively be restricted. For example, the substantially maximum number of nibbles allocated to a counter may be approximately fourteen nibbles or fifty six bits, and the number of bits used to specify the width of such a counter may be up to approximately four bits, i.e., four bits in metadata 544.

As previously mentioned, a flag may effectively be set to indicate when the value of a counter 540*a-h* is a pointer. In one embodiment, when a particular counter 540*a-h* has a value that corresponds to a pointer, a corresponding nibble within metadata 544 may be set to a value which is arranged to indicate that the particular counter 540*a-h* has a value that corresponds to a pointer. The flag or value in metadata 544 which is arranged to indicate that the value of particular counter 540*a-h* corresponds to a pointer may vary widely. In one embodiment, a value of "15" indicates that the value of a particular counter 544*a-h* is effectively a pointer to a next stage counter.

Initially, row of SRAM 536 is such that approximately zero nibbles are allocated to each of counters 540*a-h*. When a particular counter 540*a-h* is to be incremented or decremented, and augmenting the particular counter 540*a-h* will cause the particular counter 540*a-h* to overflow its allocation of nibbles, the particular counter 540*a-h* may be allocated another nibble if there are sufficient nibbles to allocate, and metadata 544 may be updated to indicate the size of the particular counter 540*a-h*. As a result, larger counters 540*a-h* may be allocated more nibbles or bits within row of SRAM 536, while smaller counters 540*a-h* may be allocated fewer nibbles or bits within row of SRAM 536. As a result, counters 540*a-h* may expand and, as appropriate, contract, such that more bits are allocated to larger counters and fewer bits are allocated to smaller counters. As counters 540*a-h* generally vary in size, e.g., some counters are relatively large while others are relatively small, the ability to expand and to contract the size of counters 540*a-h* allows various counter size patterns to be accommodated.

When a counter 540*a-h* is accessed, e.g., for purposes of incrementing or decrementing, substantially entire row of SRAM 536 is read, and metadata 544 is used to identify the values associated with each counter 540*a-h*. A particular counter 540*a-h* may be incremented or decremented as appropriate, and metadata 544 may be updated as appropriate, e.g., when the particular counter 540*a-h* is allocated an additional nibble, and then entire row of SRAM 536 may be written.

In some instances, there may be multiple relatively large counters that map to the same row, e.g., row of SRAM 536. As a result, additional memory resources may be needed to accommodate counters associated with the same row. In one embodiment, when the number of bits utilized by substantially all counters in a row, or stage, exceeds or is about to exceed the number of available bits in the row, one of the counters may be offloaded to another row, e.g., a subsequent stage. By way of example, when the number of bits utilized by counters in a stage exceeds the number of available bits associated with the stage, the largest counter may be offloaded to the next stage.

Figure 6:
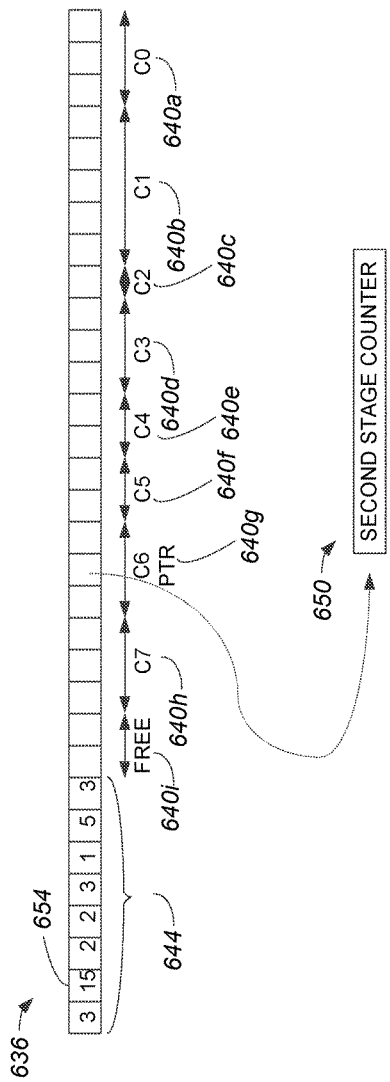
FIG. 6 is a diagrammatic representation of a first stage counter and a second stage counter in accordance with an embodiment.

Referring next to FIG. 6, a counter that is effectively offloaded from a first stage to a second stage when the first stage overflows will be described in accordance with an embodiment. As shown, a row of SRAM 636 includes eight nibbles of metadata 644, and multiple groupings 640*a-h* of bits or nibbles which represent counters, free space, and/or pointers. As shown, groupings 640*a-f* and grouping 640*j* represent counters, grouping 640*g* represents a pointer to a second stage counter 650. And grouping 640*i* represents free space. Second stage counter 650, if included in in row 634 of SRAM, would overflow the number of bits available in row 634 of SRAM. Thus, grouping 640*g* contains a pointer to second stage counter 650. In general, the largest counter included in row 634 of SRAM may be offloaded to another row, e.g., as represented by second stage counter 650, and a corresponding pointer to second stage counter 650 may be stored, e.g., in grouping 640*g*.

As shown, free bits or nibbles, e.g., as indicated by grouping 640*i*, are located at the front of bits allocated to counters. Free bits are generally available to allocate to counters as counters request additional space within row 634 of SRAM.

Bits, as for example a nibble, in metadata 644 that correspond to grouping 640*g* may be set to indicate that the contents of grouping 640*g* represent a counter. As shown, a nibble 654 in metadata 644 is set to indicate that the contents of grouping 640*g* are a pointer to a second stage counter 650. A value of "15" stored in nibble 654 indicates that the contents of a corresponding grouping, e.g., grouping 640*g*, contain a pointer to a counter and not an actual counter. It should be understood that any suitable value, or flag, may be arranged to indicate the existence of a pointer, and that a value of "15" is an example of one such suitable value.

In general, when a counter becomes valid, the counter will need an allocation of bits in a row of SRAM. If at least one nibble is not available to be allocated to the newly allocated counter, then the largest counter in the row of SRAM will be moved to another row or stage in order to accommodate the newly allocated counter, as will be discussed below with respect to FIG. 9.

Figure 9:
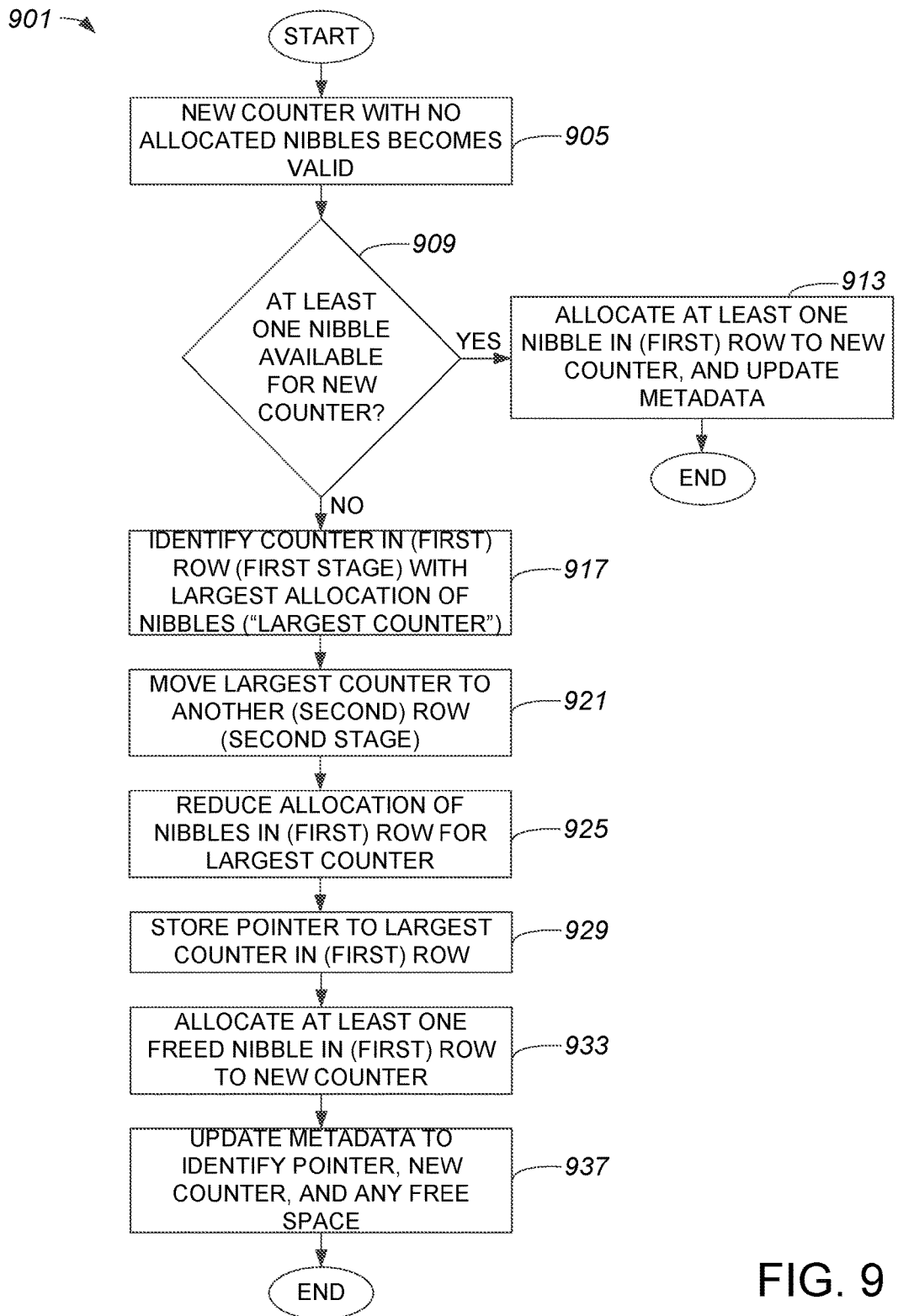
FIG. 9 is a process flow diagram which illustrates a method of allocating a new counter in a first stage that includes moving another counter to from the first stage to a second stage in accordance with an embodiment.

FIG. 9 is a process flow diagram which illustrates a method of allocating a new counter in a row that involves moving the largest counter in the row to another row in accordance with an embodiment. A method 900 of allocating a new counter begins at step 905 in which a new counter, to which no nibbles have been allocated, becomes valid. That is, a new counter is to be substantially established and incremented. In one embodiment, the new counter is to be established in a first row or stage of an array, e.g., an array of a multi-stage counter architecture, implemented on an SRAM.

A determination is made in step 905 as to whether there is at least one nibble available in the first row or stage of the multi-stage counter architecture to be allocated to the new counter. If the determination in step 905 is that there is at least one nibble available to be allocated to the new counter, at least one nibble is allocated in the first row to the new counter, and metadata is updated to indicate where in the first row the new counter is stored, in step 913. Once the new counter is allocated at least one nibble, the method of allocating a new counter is completed.

Alternatively, if the determination in step 905 is that there is not at least one nibble available in the first row or stage to allocate to the new counter, the indication is that a counter currently stored in the first row or stage is to be moved to a subsequent row or stage. Accordingly, in step 917, the counter in the first row or stage with the largest allocation of nibbles is identified. In other words, the largest counter in the first row is identified.

After the largest counter in the first row is identified, the largest counter may be moved to another row or stage, as for example a second row or stage, in step 921. Once the largest counter is moved, the allocation of nibbles in the first row for the largest counter is reduced in step 925. Reducing the allocation of nibbles in the first row for the largest counter causes nibbles to be freed for other uses, e.g., for use to store the new counter. In step 929, a pointer to the largest counter is stored in the reduced allocation of nibbles in the first row for the largest counter. That is, because the largest counter is now stored in the second row, the first row is updated to include a pointer to the largest counter.

Upon storing a pointer to the largest counter in the first row, at least one of the nibbles freed by reducing the allocation of nibbles in the first row for the largest counter is allocated to the new counter in step 933. The new counter may then be stored in the newly allocated nibble, and metadata may be updated in step 937 to identify the pointer to the largest counter, the new counter, and any free space available in the first row. Once the metadata is updated, the method of allocating a new counter is completed.

When counters adjacent to each other in a row become relatively large, the row may be overflowed and second stage counters may be allocated. If multiple adjacent first stage counters in a row become relatively large, overflowing the row may cause second stage counters to be consumed relatively rapidly. In one embodiment, relatively large counters may be distributed in different rows such that each row contains approximately the same number of relatively large counters. The placement of counters into different rows may be substantially randomized, thereby effectively distributing the location of potentially relatively large counters into different rows. To substantially randomize the placement of counters in different rows, a permuter may be implemented to obtain a counter index and to effectively map the counter index to another unique, random index.

Figure 7:
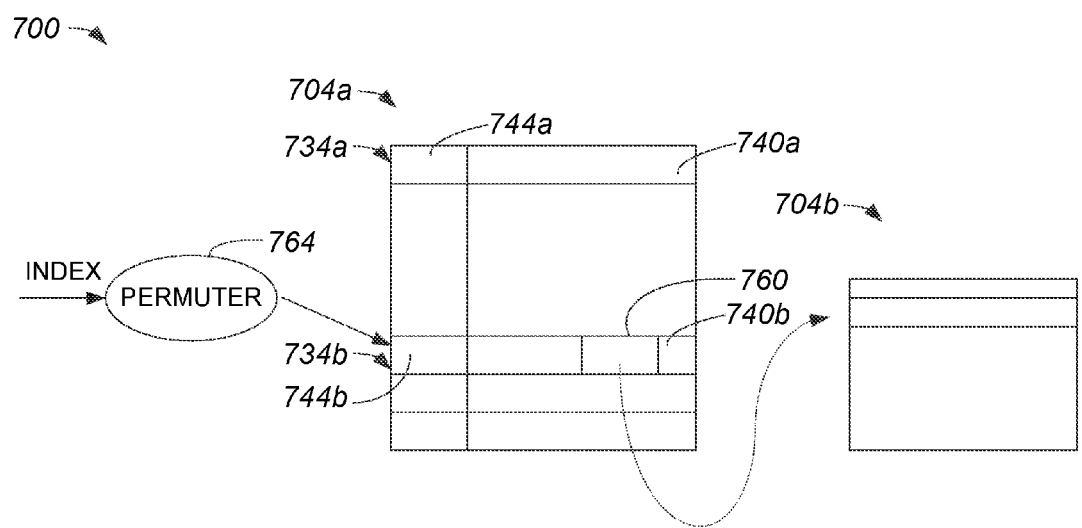
FIG. 7 is a diagrammatic representation of a static statistics counter architecture which swizzles bits in an index in accordance with an embodiment.

FIG. 7 is a diagrammatic representation of a static statistics counter architecture which swizzles bits in an index to randomize the placement of counters with respect to rows in SRAM in accordance with an embodiment. An architecture 700 includes a first array 704a that stores first stage counters and a second array 704b that stores second stage counters. Arrays 704a, 704b may be SRAM. First array 704a includes a plurality of rows 734a, 734b. Row 734a includes metadata 744a and counter bits 740a, while row 734b includes metadata 744b and counter bits 740b. As shown, counter bits 740b include a pointer to second array 704a.

When a counter index is obtained, a permuter 764 may map the index to another random index using a configuration that swizzles the bits in the index. By way of example, a 4-bit index {bit[0], bit[1], bit[2], bit[3] } may be permuted by permute 764 to obtain a new index {new_bit[0], new_bit[1], new_bit[2], new_bit[3] }, which is associated with a mapping in which bit[0] is mapped to new_bit[2], bit[1] is mapped to new_bit[0], bit[2] is mapped to new_bit[3], and bit[3] is mapped to new_bit[1]. With such a mapping, if an original index is 0110, a mapped value may be 1001. Once the random index is determined, the random index may be stored in arrays 704a, 704b as appropriate.

Figure 8:
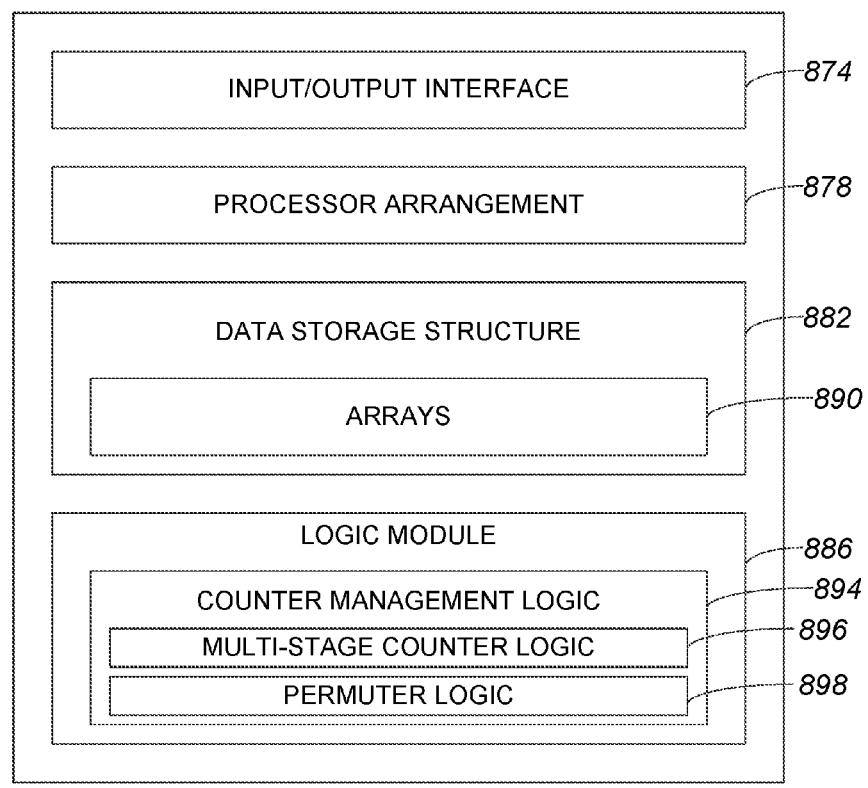
FIG. 8 is a diagrammatic representation of a node, e.g., computing system, in accordance with an embodiment.

FIG. 8 is a diagrammatic representation of a node, e.g., computing system, in accordance with an embodiment. A node 800 may generally be any network element or computing systems which is configured to implement a multi-stage counter as described above. Node 800 includes an input/output (I/O) interface 874 and a processor arrangement 878. I/O interface 874 may include wireless and/or wired interfaces, e.g., ports, which allow node 800 to communicate on a network. Packets may generally be obtained from a network on I/O interface 874, and provided to the network on I/O interface 874. Processor arrangement 878 may include any number of processors such as central processing units (CPUs) and/or microprocessors that are configured to process, e.g., execute, software logic or instructions such as software logic included in a logic module 886 of node 800.

Node 800 also includes a data storage structure 882, e.g., memory such as RAM or SRAM, which may store arrays 890. Arrays 890 may be configured to store multi-stage counters and metadata. Logic module 886 generally includes hardware and/or software logic arranged to be executed by processor arrangement 878. In the described embodiment, logic module 886 includes counter management logic 894 that allows a first stage counter to effectively be turned into a pointer when the first stage counter overflows. In the described embodiment, counter management logic 894 includes multi-stage counter logic 896 and permuter logic 898. Multi-stage counter logic 896 is configured to enable counters to be stored in multiple rows or stages, and permute logic 898 is configured to facilitate the randomization of the placement of counters into the multiple rows or stages.

When a set of counters shares space in a row of an array, the counters may shrink and expand, e.g., grow, as needed substantially without relatively rigid size constraints. Thus, a variety of counter widths may be accommodated in a row. As the counters may effectively share space and expand dynamically, a relatively large number of wide counters may effectively be absorbed because they may be spread across multiple rows of an array. By absorbing a relatively large number of wide counters in a first stage of counters, the need to use a second stage of counters may be reduced. Decreasing the need to use second stage counters allows the number of second stage counters that are allocated to be significantly reduced. Further, the need to utilize third stage of counters may also be decreased and, as such, memory usage as well as latency may be reduced.

Although only a few embodiments have been described in this disclosure, it should be understood that the disclosure may be embodied in many other specific forms without departing from the spirit or the scope of the present disclosure. By way of example, while the embodiments have generally been described in terms of being implemented on an on-chip SRAM, it should be appreciated that the embodiments may generally be implemented with respect to any suitable memory.

As described above with respect to FIG. 9, when a new counter becomes valid and there is insufficient memory in a row to accommodate that counter, the largest counter in the row may be identified and moved to another row such that the new counter may be accommodated in the row. While moving the largest counter is effective in freeing bits or nibbles for allocation to the new counter, it should be understood that substantially any counter may be moved to accommodate the new counter. That is, counters other than the largest counter may be moved to accommodate a new counter.

Bits in memory have been described as being grouped into nibbles for the purposes of allocating memory to counters. In general, bits in memory may be divided into any suitable unit of memory that may be allocated to counters. Units of memory or memory storage units may generally include any number of bits. For example, a unit of memory may include a single bit, or may include four bits and be substantially equivalent to a nibble.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, structures, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   determining whether at least one memory storage unit in a first stage of a multi-stage array is available for use by a first counter associated with the first stage;
   allocating the at least one memory storage unit for use by the first counter when it is determined that the at least one memory storage unit is available for use by the first counter; and
   when it is determined that the at least one memory storage unit is not available for use by the first counter:
      identifying a second counter, the second counter being stored in a first location in the first stage, the first location including a first memory storage unit and a second memory storage unit;
      moving the second counter to a second stage of the multi-stage array;
      storing a pointer to the second stage, the pointer being stored in the first memory storage unit and arranged to identify the second counter in the second stage; and
      allocating the second memory storage unit to the first counter.

2. The method of claim 1 wherein when it is determined that the at least one memory storage unit is not available for use by the first counter, the method further includes:
   updating metadata associated with the first stage to indicate that the pointer is stored in the first memory storage unit; and
   updating the metadata associated with the first stage to indicate that the second memory storage unit is allocated to the first counter.

3. The method of claim 2 wherein the first location further includes a third memory storage unit, and the method further includes:
   providing an indication arranged to indicate that the third memory storage unit is free.

4. The method of claim 1 wherein the first counter is a new counter to which no bits have previously been allocated, and wherein the method further includes:
   determining that the first counter is to be stored in the first stage; and
   storing the first counter in the second memory storage unit after allocating the second memory storage unit to the first counter.

5. The method of claim 1 wherein the first counter is an existing counter, and wherein determining whether the at least one memory storage unit in a first stage of a multi-stage array is available for use by the first counter includes determining whether updating the first counter will overflow the first stage.

6. The method of claim 1 wherein identifying the second counter includes identifying the second counter as a largest counter stored in the first stage.

7. Logic encoded in one or more tangible non-transitory, computer-readable media for execution and when executed operable to:
   determine whether at least one memory storage unit in a first stage of a multi-stage array is available for use by a first counter associated with the first stage;
   allocate the at least one memory storage unit for use by the first counter when it is determined that the at least one memory storage unit is available for use by the first counter; and when it is determined that the at least one memory storage unit is not available for use by the first counter:
identify a second counter, the second counter being stored in a first location in the first stage, the first location including a first memory storage unit and a second memory storage unit;
move the second counter to a second stage of the multi-stage array;
store a pointer to the second stage, the pointer being stored in the first memory storage unit and arranged to identify the second counter in the second stage; and
allocate the second memory storage unit to the first counter.

8. The logic of claim 7 wherein when it is determined that the at least one memory storage unit is not available for use by the first counter, the logic is further operable to:
update metadata associated with the first stage to indicate that the pointer is stored in the first memory storage unit; and
update the metadata associated with the first stage to indicate that the second memory storage unit is allocated to the first counter.

9. The logic of claim 8 wherein the first location further includes a third memory storage unit, and the logic is further operable to:
provide an indication arranged to indicate that the third memory storage unit is free.

10. The logic of claim 7 wherein the first counter is a new counter to which no bits have previously been allocated, and wherein the logic is further operable to:
determine that the first counter is to be stored in the first stage; and
store the first counter in the second memory storage unit after allocating the second memory storage unit to the first counter.

11. The logic of claim 7 wherein the first counter is an existing counter, and wherein the logic operable to determine whether the at least one memory storage unit in a first stage of a multi-stage array is available for use by the first counter is operable to determine whether updating the first counter will overflow the first stage.

12. The logic of claim 7 wherein the logic operable to identify the second counter is operable to identify the second counter as a largest counter stored in the first stage.

13. An apparatus comprising:
a processor;
a data storage structure, the data storage structure including a multi-stage array, the multi-stage array including at least a first row and a second row; and
a logic module, the logic module including computer program code arranged to be executed by the processor, the logic module including logic configured to determine whether at least one memory unit in the first row is available for use by a first counter and logic configured to move a second counter from a first location in the first row to the second row when it is determined that the at least one memory unit in the first row is not available and to store a pointer to the second row, the pointer being stored in a first memory unit associated with the first location.

14. The apparatus of claim 13 wherein the data storage structure is a static random access memory (SRAM).

15. The apparatus of claim 13 wherein the first location also includes a second memory unit, and where the logic module further includes logic configured to allocate the second memory unit to the first counter.

16. The apparatus of claim 15 wherein the data storage structure includes metadata, and wherein the logic module further includes logic configured to update the metadata to indicate that the pointer is stored in the first memory unit and that the second memory unit is allocated to the first counter.

17. The apparatus of claim 13 wherein the logic configured to move the second counter from the first location in the first row to the second row is configured to identify the second counter as a largest counter in the first row.

18. The apparatus of claim 17 wherein the logic configured to move the second counter from the first location in the first row to the second row is configured to move the second counter to a first free location in the second row.

19. The apparatus of claim 13 wherein the at least one memory unit includes four bits.

20. The apparatus of claim 13 wherein the logic configured to determine whether the at least one memory unit in the first row is available for use by the first counter is configured to allocate the at least one memory unit for use by the first counter when it is determined that the at least one memory unit in the first row is available for use by the first counter.

* * * * *